United States Patent [19]

Watanabe et al.

[11] 4,362,371
[45] Dec. 7, 1982

[54] MOTOR DRIVE APPARATUS

[75] Inventors: Yoshitaka Watanabe, Tokyo; Tomonori Iwashita, Fuchu, both of Japan

[73] Assignee: Canon Kabushiki Kaisha, Tokyo, Japan

[21] Appl. No.: 279,244

[22] Filed: Jul. 1, 1981

[30] Foreign Application Priority Data

Jul. 4, 1980 [JP] Japan .................................. 55-91464

[51] Int. Cl.³ .............................................. G03B 1/04
[52] U.S. Cl. .................................................... 354/173
[58] Field of Search ......................................... 354/173

[56] References Cited

U.S. PATENT DOCUMENTS 4,167,314  9/1979  Ichiyanagi et al. ................. 354/173

Primary Examiner—Michael L. Gellner
Attorney, Agent, or Firm—Toren, McGeady and Stanger

[57] ABSTRACT

A motor drive apparatus constructed to be not only attachable to cameras having mechanical coupling parts of two different types which are ordinarily not interchangeable. A change-over switch inserted in the mode signal transmission line of the motor drive apparatus closes when the apparatus is attached to a camera of the former type and opens when it is attached to a camera of the latter type.

14 Claims, 7 Drawing Figures

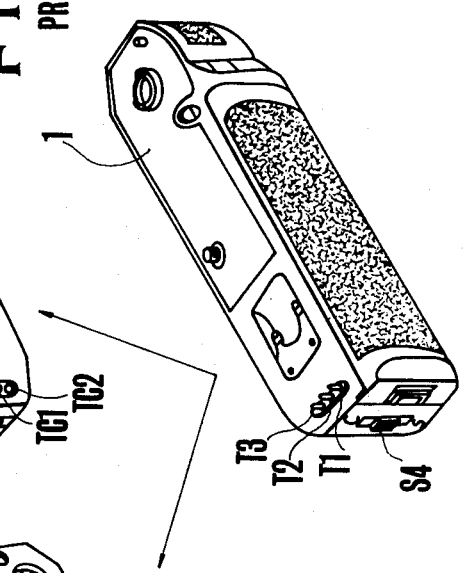
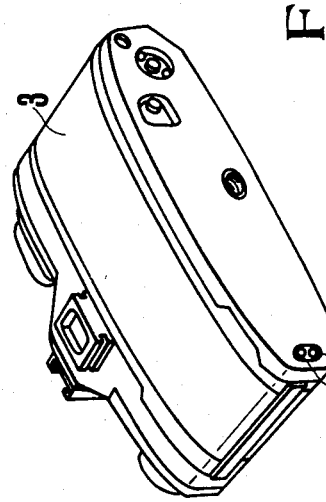
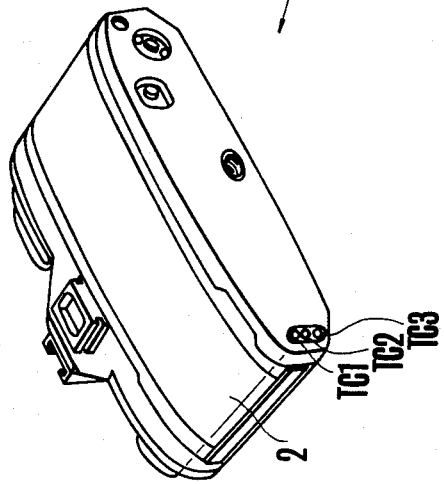
FIG. 1A
FIG. 1B
FIG. 1C
PRIOR ART

MOTOR DRIVE APPARATUS

BACKGROUND OF THE INVENTION

1. Field of the Invention

This invention relates to a motor drive apparatus for a camera and more particularly to a driving circuit and structural arrangement of connecting terminals of the motor drive apparatus (hereinafter called the motor drive unit).

2. Description of the Prior Art

With the advancement of applications of electronics to cameras in recent years, many cameras accomplish film winding and rewinding operations by attachable motor drive units. Each of these motor drive units is provided with electrical connection terminals for signal transmission. The terminals are disposed, in addition to a mechanical driving force transmitting part, between the camera and a cooperating motor drive unit. A shutter release signal, a winding completion signal, etc. are transmitted between the camera and motor drive unit through these terminals. Ordinarily, an attempt to diversify the function of the motor drive unit with an additional facility for switch-over between single shot photographing (hereinafter called S for short) and continuous photographing (hereinafter called C for short) necessitates an increase in the number of signal transmission terminals required.

A cooperating camera and motor drive unit, each having all such signal transmission terminals plus a part for effecting change-over between continuous photographing and single-shot photographing (hereinafter called C-S change-over part), are able to perform a switch-over action between single shot photographing and continuous photographing. The part for effecting change-over may be disposed on the side of the motor drive unit. However, an attempt to use such a motor drive unit that has all such signal transmission terminals in combination with a camera having a lesser number of connection terminals tends to cause various inconveniences such as a short circuit between terminals resulting from bringing some of the terminals on the side of the motor drive unit into contact with a grounded casing or the like disposed on the side of the camera body.

In the accompanying drawings, FIGS. 1A, 1B and 1C show an example of the above. A motor drive unit 1 shown in FIG. 1C is provided with signal transmission terminals T1, T2 and T3. These terminals are arranged to effect circuit connection when brought into contact with faces of signal terminals disposed on the bottom face of the casing of a camera. The motor drive unit 1 is further provided with a C-S change-over operation part S4 for selection between single shot photographing and continuous photographing. When the motor drive unit 1 which has the terminals arranged as described above is attached to a camera 2 having signal terminals TC1, TC2 and TC3 as shown in FIG. 1A, a circuit provided on the side of the motor drive unit and a circuit provided on the side of the camera body are connected to each other through these terminals to effect transmission of a signal. Then, a selecting operation on the switch S4 enables the camera to operate either in a single shot photographing mode or in a continuous photographing mode accordingly.

In the case of a camera 3 shown in FIG. 1B, there are provided only two terminals TC1 and TC2 on the side of the camera body. When the motor drive unit 1 shown in FIG. 1C is attached to the camera body 3, one of the terminals provided on the side of the motor drive unit 1 (for example, the terminal T3) comes into contact with the casing of the camera body to be thus grounded thereby.

With the motor drive unit 1 which is shown in FIG. 1C connected to the camera 2 shown in FIG. 1A, a circuit is formed as shown in FIG. 2. In FIG. 2, the camera body circuit portion is identified by the letter "C" and a motor drive unit circuit portion is identified by the letter "M". The two circuits are connected to each other through a grounding terminal T1, winding signal terminals T2 and a mode signal terminal T3. A circuit block A on the camera side represents a known camera control circuit including a light measuring circuit, a shutter release circuit including an electromagnet and an exposure control circuit. There are provided a power source B' for the camera; a release switch S1 which is turned on when a release button is depressed and is turned off when the button is released from the depressed position; and a winding switch S2 in which the wiper is connected to the terminal b upon completion of a shutter release action, and to another terminal a, upon completion of a film winding action. In the motor drive unit, there are provided a power source battery B; a power source switch S3; a mode switch S4 which performs a switch-over action between single-shot photographing (S) and continuous photographing (C); and a motor M. Transistors $Tr_1$, $Tr_2$ and $Tr_3$ form a control circuit. Reference symbols $R_1$, $R_2$ and $R_3$ indicate resistors and D a diode. The operation of the circuit shown in FIG. 2 is as follows:

Upon completion of film winding, the wiper of switch S2 of circuit C contacts terminal a. Depressing the shutter button closes the switch S1. Assuming that the mode switch S4 on the motor drive unit side M is in the position C for continuous photographing and that the power source switch S3 is on, the transistor $Tr_1$ is off. Accordingly, transistors $Tr_2$ and $Tr_3$ which are provided for driving the motor M, are off. Accordingly, the motor M is not driven. Operation of the electromagnet provided within the camera control circuit A produces a shutter release action in a known manner. Upon completion of the shutter release action, the switch S2 shifts to the terminal b. The transistor $Tr_1$ is then biased by the resistor $R_2$ and turns on. This in turn causes the transistors $Tr_2$ and $Tr_3$ to turn on respectively. Accordingly, the motor M rotates to perform a winding action through a film winding system which is not shown. Upon completion of the winding action, the switch S2 shifts to terminal a to bring the motor M to a stop as described above. In that instance, if the release button is continuously depressed, the release switch S1 continues to be closed. Therefore, another shutter release action occurs. Repetition of these operations occurs in continuous photographing. When the shutter button is released from the depressed position, the switch S1 turns off to bring the release action to a stop.

For single shot photographing, the mode change-over switch S4 is shifted to its position S as shown in FIG. 2. In this case, the switch S1 turns on in response to depression of the release button. This causes a release action to take place on the side of the camera. Upon completion of the release action, the switch S2 shifts to the terminal b to cause the transistor $Tr_1$ to turn on. However, since the collector current of the transistor $Tr_1$ flows to the terminal T3 (through the resistor $R_3$ and the diode D) and is then grounded through the switch S1, the motor driving transistors Tr$_2$ and Tr$_3$ are maintained in the off state. Therefore, the motor M does not rotate and no winding action is performed. Then, when the shutter release button is released from the depressed position, the switch S1 turns off. The collector current of the transistor Tr$_1$ becomes the base current of the transistor Tr$_2$ to cause the motor driving transistors Tr$_2$ and Tr$_3$ to turn on. This in turn causes the motor M to rotate to perform a winding action. Upon completion of the winding action, the switch S2 shifts to the terminal a. Following this, a subsequent depression of the shutter release button again initiates single shot photographing as described above.

Let us now consider a case where the motor drive unit 1 shown in FIG. 1C is attached to the other camera 3 which is provided with only the signal transmission terminals TC1 and TC2 (hereinafter called a camera having a mechanical coupling part of a different type), the terminal T3 shown in FIG. 2 contacts the camera body and the grounding line as indicated by a broken line in FIG. 2. Under this condition, if the mode changeover switch S4 is in the continuous photographing position C, continuous photographing can be accomplished through the actions of the release switch S1 and winding completion switch S2 disposed on the side of the camera body C. When the switch S4 is shifted to the single-shot photographing position S, the switch S2 comes to shift to the terminal b thereof upon completion of a release action. Then, even when the transistor Tr$_1$ turns on, the base voltage of the driving transistor Tr$_2$ becomes almost equal to ground potential through the diode D, the switch S4 and the terminal T3. Therefore, the motor M then does not rotate. This construction not only makes the film winding action impossible but also results in wasting much energy of the battery B because the collector current of the transistor Tr$_1$ continues to flow through the resistor R$_3$ to the circuit of the diode D, the mode switch S4 and the terminal T3. Thus a motor drive unit of the type, as shown in FIG. 1C, cannot be used for a camera of the type, as shown in FIG. 1B, in the mode S (single shot photographing mode) though it is usable for such a camera in the mode C (continuous photographing mode).

SUMMARY OF THE INVENTION

It is an object of this invention to provide a motor drive unit which eliminates the above stated shortcoming of the conventional motor drive units and is usable also for a camera having a mechanical coupling part of a different type.

It is another object of this invention to provide a motor drive unit which not only meets the above stated object of the invention but also obviates the necessity of any manual operation when the unit is used for cameras of different types.

These and further objects and features of the invention will become apparent from the following detailed description of embodiments thereof taken in connection with the accompanying drawings.

BRIEF DESCRIPTION OF THE DRAWINGS

FIG. 1C is a perspective view of a conventional motor drive unit having three signal transmission terminals and a mode change-over switch.

FIGS. 1A and 1B are perspective views showing the bottom faces of cameras of two different types permitting the motor drive unit of FIG. 1C to be attached thereto respectively.

DETAILED DESCRIPTION OF THE PREFERRED EMBODIMENTS

Figure 3:
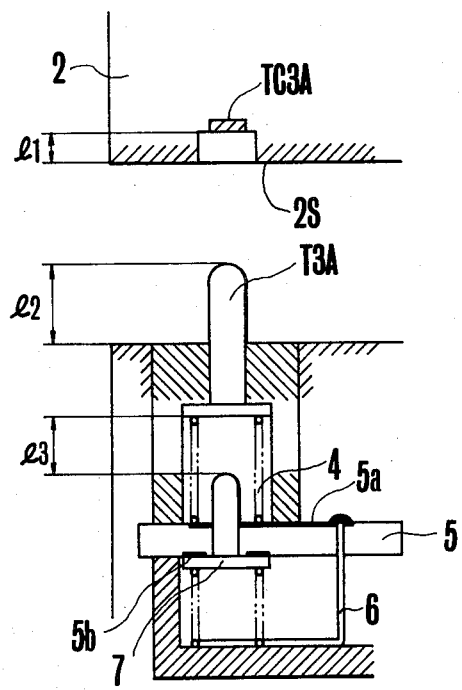
FIG. 3 is a partial sectional view showing a signal transmission terminal in accordance with one embodiment of the present invention.

Referring to FIG. 3 there is shown a signal transmission terminal in accordance with one form of the invention. In this embodiment, the mode signal terminal T3 used in the motor drive unit shown in FIG. 1C is replaced by a mode terminal T3A as shown in FIG. 3. The mode signal terminal T3A is provided for transmission of a mode signal between the motor drive unit and the camera body. A spring 4 is made of a conductive material and is arranged to urge the terminal T3A toward the mounting face of the motor drive unit. A substrate 5 has conductive parts 5a and 5b respectively printed on the upper and lower faces thereof. The spring 4 is mounted on one end of the upper conductive part 5a. Another spring 6, which is made of a conductive material has a portion thereof which is soldered to the other end of the upper conductive part 5a, as shown in FIG. 3. The spring 6 has a pin 7 mounted thereon. The spring 6 urges the pin 7 to bring it into contact with the conductive part 5b on the lower face of the substrate 5. Meanwhile, a lead wire, which is not shown, extends from the other end of the conductive part 5b and is connected to the C-S change-over switch S4 (see FIG. 4) of the motor drive unit. A reference numeral 2 indicates a camera of the type shown in FIG. 1A (hereinafter called a type A camera). A signal terminal TC3A, which is connected to a switch S1 (see FIG. 4) of the camera, is disposed within a recessed part at a depth 11 from the bottom surface 2S of the camera. When the motor drive unit does not have the camera 2 mounted thereon, the motor drive unit has a protruding extent 12 of the terminal T3A and a distance 13 between the lower end of the terminal T3A and the upper end of the pin 7. These lengths have the relationship of 12>13>11.

Figure 2:
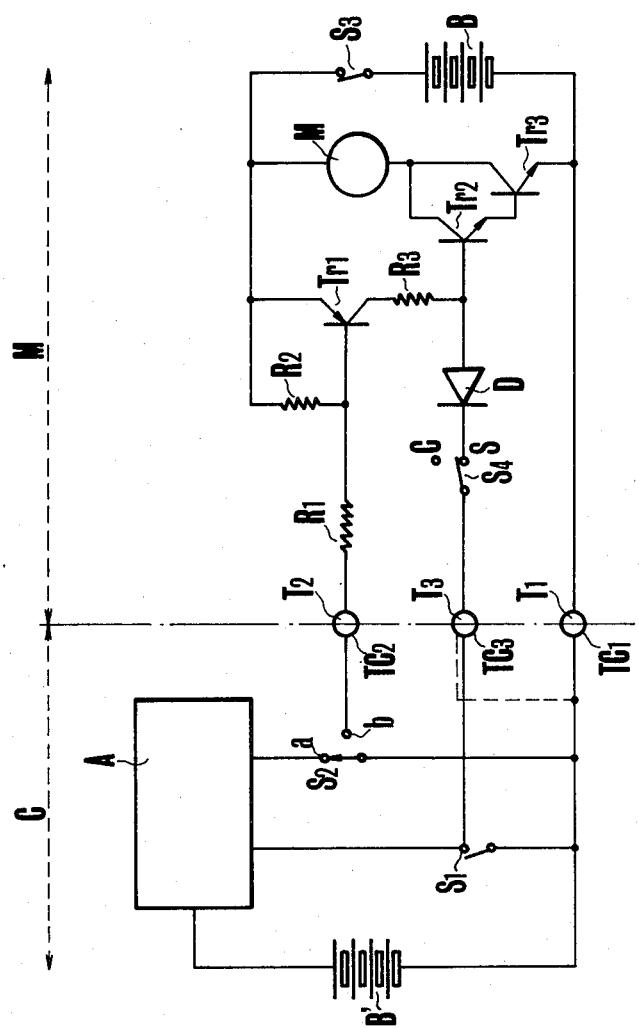
FIG. 2 is a circuit diagram showing the circuit connections of the respective circuits of the motor drive unit and the camera, shown in FIG. 1, when they are coupled to each other.
Figure 4:
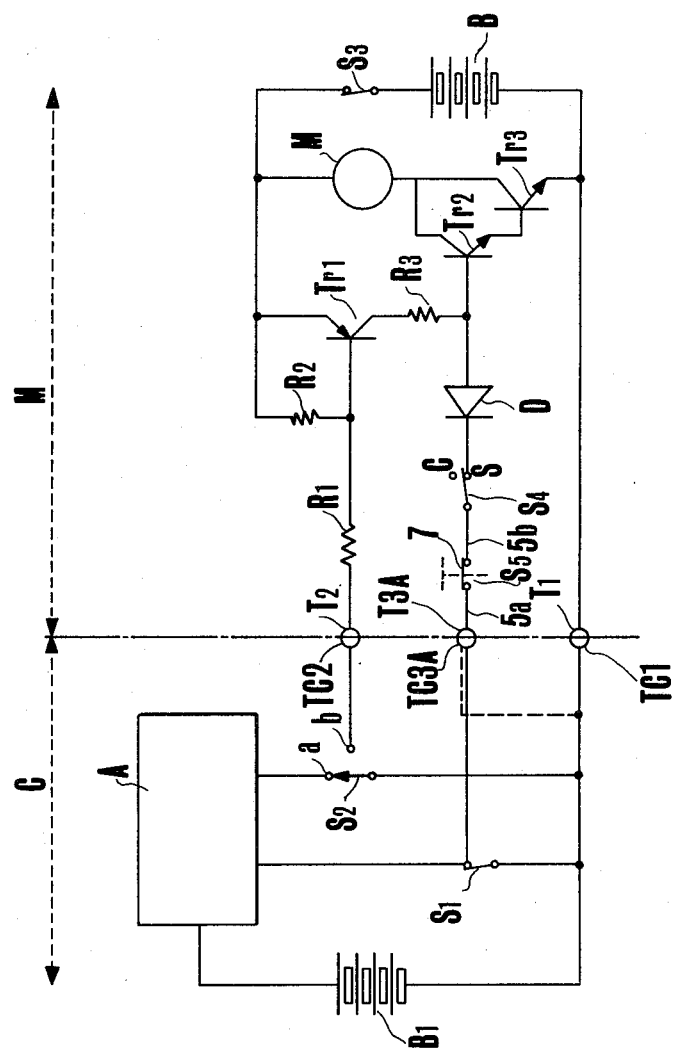
FIG. 4 is a circuit diagram showing a motor drive unit, according to the invention, having the signal transmission terminals arranged in the manner shown in FIG. 3.

FIG. 4 is a circuit diagram showing a motor drive unit having a signal terminal T3A constructed in the manner shown in FIG. 3. The circuit of FIG. 4 is arranged in the same manner as in the circuit of FIG. 2 with the exception that: a camera selection switch S5 is inserted in series between the mode signal terminal T3A and the mode switch S4.

The switch S5, shown in FIG. 4, is formed by the conductor parts 5a and 5b printed on the substrate 5 and the pin 7, which are shown in FIG. 3. When the motor drive unit 1 is attached to a type A camera 2, the terminal T3A (see FIG. 3) comes into contact with the contact TC3A of the camera and the position of the terminal T3A lowers as much as 11. However, the terminal T3A never pushes the pin 7 down because of the relation of 13>11. Accordingly, the pin 7 is thus kept in contact with the conductive part 5b, which is secured to the lower face of the substrate 5. Therefore, the mode switch S4 is sequentially connected to the switch S1 of the camera 2 through the elements: switch S1—contact TC3A—terminal T3A—spring 4—conductive part 5a—spring 6—pin 7—conductive part 5b and switch S4. This sequence of connection forms a signal line (hereinafter called the mode signal line). In other words, the switch S5 shown in FIG. 4 is on and, under this condition, the operations of the camera and the motor drive unit are feasible either in the mode C or in the mode S.

In a similar manner the terminals T1 and TC1, T2 and TC2 are also connected.

Next, when the motor drive unit having the signal terminal T3A shown in FIG. 3 is attached to a camera of the other type shown in FIG. 1B (hereinafter called a type B camera), the terminal T3A on the side of the motor drive unit comes into contact with the lower face 2S of the camera 3 shown in FIG. 3 and descends a distance l2. Then, because of the relation l2>l3, the terminal T3A pushes the pin 7 downward as much as l2-l3. This cuts off the electrical contact between the pin 7 and the lower conductive part 5b of the substrate 5. Accordingly, the conductive part 5b connected to the mode switch S4 and the terminal T3A short circuiting to ground (or the bottom plate 2S) of the camera 3 are automatically rendered nonconductive. Under this condition, the switch S5, shown in FIG. 4, is off as indicated by a dotted line there. In this instance, continuous photographing can be carried out in the mode C as mentioned in the foregoing. Then, with the mode S selected, since the switch S5 is off, the collector current of the transistor $Tr_1$ becomes the base current of the transistor $Tr_2$ to cause the transistor $Tr_2$ to turn on and thus to also cause the transistor $Tr_3$ to turn on even if the shutter release button is kept depressed after completion of shutter release. Therefore, the motor drive unit operates in the same manner as in the above stated mode C and comes to a stop after completion of the film winding action. With the mode S selected, therefore, the motor drive unit according to the invention, unlike the conventional motor drive unit shown in FIGS. 1 and 2, never allows the collector current of the transistor $Tr_1$ to flow from the terminal T3A to the ground of the camera to waste the energy of the battery.

Figure 5:
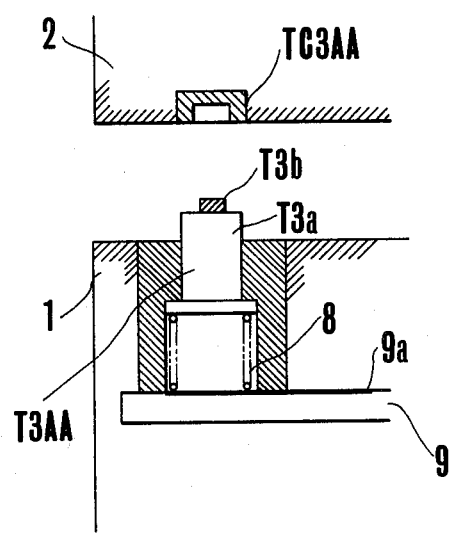
FIG. 5 is a partial sectional view showing another embodiment of the present invention.

Another embodiment of the invention is shown in a sectional view in FIG. 5. The circuit of the embodiment is substantially the same as the one shown in FIG. 4. The circuit arrangement of the embodiment is therefore omitted from detailed description herein. Referring now to FIG. 5, a signal terminal T3AA consists of a conductive part T3a and an insulator part T3b. A spring 8, which is made of a conductive material, is mounted on a conductive portion 9a printed on a substrate 9 and is thus arranged to urge the terminal T3AA upward. The other end of the conductive part 9a is connected to the mode switch S4 shown in FIG. 4. The contact TC3AA of the type A camera 2 which is connected to this terminal T3AA is connected to the release switch S1 of the camera control circuit. The central part of the contact TC3AA is concave. When the motor drive unit 1 is attached to the type A camera 2, therefore, the mode signal line consisting of switch S1—contact TC3AA—conductive part T3a—spring 8—conductive part 9a—switch S4 becomes conductive. In other words, in the arrangement as shown in FIG. 4, the switch S5 is conductive in this condition.

When the motor drive unit 1 is coupled to the type B camera 3 which has no need for the terminal T3AA, the insulator T3b comes into contact with the face of the camera. The conductor part T3a of the terminal T3AA is pushed inward from the upper face of the motor drive unit 1 and is thus automatically prevented from coming into contact with the ground of the camera 3. This produces the same effect as when the switch S5, shown in FIG. 4, is turned off. Accordingly, the battery is effectively prevented from being wasted in the same manner as in the embodiment shown in FIG. 3.

As will be understood from the foregoing detailed description of embodiments, the invented motor drive unit can be coupled to cameras of different types. The signal terminals of the motor drive unit, in accordance with the invention, shift to suit any of the types of existing cameras. A motor drive unit having multiple function and which also is interchangeable is highly advantageous.

What is claimed is:

1. A motor drive apparatus to be coupled with a camera for winding film, comprising:
   (a) a winding signal terminal;
   (b) a grounding terminal;
   (c) a mode signal terminal;
   (d) a mode signal line connected to said mode signal terminal; and
   (e) switching means inserted in said mode signal line connected to said mode signal terminal, said means to render said mode signal line ineffective when the motor drive apparatus is attached to a camera having a mechanical coupling member of a type different from that of the apparatus.

2. A motor drive apparatus according to claim 1, wherein said switching means opens when said motor drive apparatus is attached to the camera having a mechanical coupling member of the different type and closes when the apparatus is attached to a camera having a mechanical coupling member of the same type as that of the apparatus.

3. A motor drive apparatus according to claim 1, wherein said switching means is provided with a member which is arranged to open or close said mode signal line according to the type of the mechanical coupling member of the camera to which the motor drive apparatus is attached.

4. A motor drive apparatus according to claim 1 further including:
   a mode switch inserted in said mode signal line.

5. A motor drive apparatus according to claim 4, said switching means being provided with:
   a first electrical conductive member arranged to be connected to said mode signal terminal;
   a second electrical conductive member arranged to be connected to said mode switch; and
   a connecting member arranged to selectively connect the first electrical conductive member or the second electrical conductive member in accordance with the type of the camera to which the motor drive apparatus is attached.

6. A motor drive apparatus according to claim 5, wherein said connecting member consists of a pin.

7. A motor drive apparatus to be coupled with a camera for film winding, comprising:
   (a) a signal terminal arranged to be connected to the electrical ground of the camera when the motor drive apparatus is attached to the camera;
   (b) a signal line connected to said signal terminal; and
   (c) change-over means connected to said signal line, said change-over means being arranged to selectively bring said signal line into an effective state or into an ineffective state thereof according to the type of camera to which the motor drive apparatus is attached.

8. A motor drive apparatus according to claim 7, wherein said change-oveer means is arranged to selectively open or close said signal line according to the type of the camera to which the motor drive apparatus is attached.

9. A motor drive apparatus configured for coupling to first and second associated cameras, the second associated camera having a greater number of terminals interfacing the second associated camera with said motor drive apparatus than said first associated camera, comprising:

switching means in said motor drive apparatus, said switching means including means to position said switching means in a first position when said motor drive apparatus is coupled to the first associated camera and to a second position when said motor drive apparatus is coupled to said second associated camera.

10. A motor drive apparatus according to claim 9, wherein said switching means includes an operating member responsive to different geometric configurations of the first and second associated cameras.

11. A motor drive apparatus according to claim 10, wherein said operating member is an electrical contact.

12. A motor drive apparatus according to claim 11, further including:

a conductive spring cooperating with said first contact member is biased by a conductive spring which is connected electrically to said first contact member.

13. A motor drive apparatus according to claim 12, wherein said contact member is elongated and said motor drive apparatus further includes a second elongated contact member which is disposed generally in coaxial relationship with said first contact member.

14. A motor drive apparatus according to claim 13, wherein said first and second contact members are axially dimensioned and mounted to produce progressive switching actuation whereby an initial movement of said first contact member moves only said first contact member and further movement of said first contact member moves both said first and second contact members.

* * * * *